United States Patent
Burgoyne et al.

(10) Patent No.: US 11,688,932 B2
(45) Date of Patent: Jun. 27, 2023

(54) SATELLITE ANTENNA

(71) Applicant: Hedron Space Inc., Cambridge, MA (US)

(72) Inventors: Hayden Burgoyne, Cambridge, MA (US); Weston Alan Marlow, Cambridge, MA (US); Joseph Atkinson, Cambridge, MA (US)

(73) Assignee: HEDRON SPACE INC., Cambridge, MA (US)

(*) Notice: Subject to any disclaimer, the term of this patent is extended or adjusted under 35 U.S.C. 154(b) by 93 days.

(21) Appl. No.: 17/168,664

(22) Filed: Feb. 5, 2021

(65) Prior Publication Data

US 2021/0249763 A1     Aug. 12, 2021

Related U.S. Application Data

(60) Provisional application No. 62/971,404, filed on Feb. 7, 2020.

(51) Int. Cl.
| | |
|---|---|
| *H01Q 1/28* | (2006.01) |
| *H01Q 15/16* | (2006.01) |
| *H04B 7/185* | (2006.01) |
| *H01Q 1/08* | (2006.01) |
| *H01Q 15/02* | (2006.01) |

(52) U.S. Cl.
CPC .............. *H01Q 1/288* (2013.01); *H01Q 1/08* (2013.01); *H01Q 15/02* (2013.01); *H01Q 15/161* (2013.01); *H04B 7/18515* (2013.01)

(58) Field of Classification Search
CPC ............ H01Q 1/08; H01Q 1/085; H01Q 1/12; H01Q 1/1235; H01Q 1/288; H01Q 1/36; H01Q 1/38; H01Q 15/02; H01Q 15/14; H01Q 15/142; H01Q 15/16; H01Q 15/161; H01Q 15/162; H01Q 15/163; H01Q 15/168; H01Q 15/20; H01Q 19/13; H04B 7/18515
See application file for complete search history.

(56) References Cited

U.S. PATENT DOCUMENTS

| | | | | |
|---|---|---|---|---|
| 3,496,687 | A * | 2/1970 | Greenberg | E04B 7/16 343/915 |
| 4,994,816 | A * | 2/1991 | Kondo | H01Q 1/1235 343/882 |
| 5,184,145 | A * | 2/1993 | Devillers | H01Q 1/1235 343/916 |
| 5,635,946 | A * | 6/1997 | Francis | H01Q 15/161 343/915 |
| 6,124,835 | A * | 9/2000 | Nguyen | H01Q 15/162 343/DIG. 2 |
| 2006/0270301 | A1* | 11/2006 | Marks | H01Q 15/142 442/304 |
| 2019/0207317 | A1* | 7/2019 | Hong | H01Q 5/357 |
| 2019/0214737 | A1* | 7/2019 | Dominocielo | H01Q 15/161 |
| 2022/0359992 | A1* | 11/2022 | Plaza Mora | H01Q 1/08 |

FOREIGN PATENT DOCUMENTS

CN          106532221 A  *  3/2017

* cited by examiner

*Primary Examiner* — Ab Salam Alkassim, Jr.
*Assistant Examiner* — Leah Rosenberg
(74) *Attorney, Agent, or Firm* — Goodwin Procter LLP

(57) ABSTRACT

An antenna includes ribs that have been folded to fit within a frame, a conductive mesh coupled to the ribs, an arm that has been folded to fit within the frame, and a feed disposed at a distal end of the arm.

17 Claims, 9 Drawing Sheets

SATELLITE ANTENNA

CROSS-REFERENCE TO RELATED APPLICATIONS

This application claims the benefit of U.S. Provisional Application No. 62/971,404, filed on Feb. 7, 2020. The contents of the aforementioned application are hereby incorporated by reference in their entirety.

BACKGROUND OF THE INVENTION

This invention relates to satellite communication, and in particular, to antennas used in such communications.

In a satellite, it is useful to provide an antenna for communication with either other satellites or with a ground station. A suitable antenna is one that transmits and receives efficiently over a wide range of wavelengths. This enables the satellite to communicate over multiple channels with the same hardware. Since the satellite must be launched into orbit, the antenna must transition between a folded state that is suitable for launch into an unfolded state in which it is suitable for communication.

SUMMARY OF THE INVENTION

In one aspect, the invention features a frame and an antenna. The antenna includes ribs that have been folded to fit within the frame. It also includes a conductive mesh coupled to the ribs, an arm that has been folded to fit within the frame, and a feed disposed at a distal end of the arm.

In some embodiments, the feed includes conductive paths on a dielectric in contact. Among these are embodiments in which the first and second conductive paths define first and second spirals. In other embodiments, the conductive paths are of constant width. In a preferred embodiment, the paths are dimensioned and configured to preferentially transmit and receive in a range between S band and Ka band. In other embodiments, the paths are dimensioned and configured to preferentially transmit and receive in $K_a$ band.

Yet other embodiments include a multi-segment arm that articulates between segments. In such embodiments, the arm includes proximal and distal segments, with the distal end being an end of the distal segment. Such embodiments include a joint between the distal and proximal segments.

Among the multi-segment arms are those that include three or more segments and corresponding joints that are disposed to permit articulation of segments relative to each other.

In other embodiments, the arm, once it has been deployed, holds the feed at a focus of a paraboloid that has been formed by the mesh as a result of the mesh also having been deployed.

Yet other embodiments feature an arm in which a segment thereof includes a cradle for receiving the feed. Among these are embodiments in which the cradle is at the proximal arm.

Yet other embodiments feature a cantilevered arm.

In still other embodiments, the arm is a multi-segment arm in which the segments differ from each other in a way that promotes folding of the arm so that it fits in the frame. Among these are embodiments in which the arms become progressively narrower as one approaches the feed. In particular, for an arm that has a first segment and a second segment, with the second segment being closer to the distal tip than the first segment once the arm has been unfolded, the second segment is narrower than the first segment.

In other embodiments, each rib includes a tip segment, a root segment, and a hinge between the root segment and the tip segment. The tip segment includes a distal tip of the rib and the root segment is attached to a pusher plate to which all of the ribs are mounted. Among these are embodiments in which the hinge couples the root segment to the tip segment.

In some embodiments, all the ribs have a root segment that mounts to a common pusher plate by a corresponding hinge.

Further embodiments include a satellite. In such embodiments, the satellite includes the antenna and frame as constituent parts thereof.

Other embodiments include a satellite network. In these embodiments, wherein the antenna and frame are constituent parts of one or more satellites of the satellite network.

A variety of materials can be used to form the mesh, the key requirement being that the material be conductive. In some embodiments, the mesh includes a gold-coated metal. Examples of suitable metals include tungsten and includes gold-coated molybdenum.

In another aspect, the invention features a method that includes deploying an antenna on a satellite. In such a method, deploying the antenna includes causing a multi-segment arm to emerge from a frame, unfolding the multi-segment arm, causing a feed at a distal tip of the arm to be held away from the frame, causing a plurality of ribs to emerge from the frame, causing a mesh connected to the ribs to form a paraboloidal surface having a focus that coincides with a location of the feed.

Among the practices of the foregoing method are those that also include using the antenna to establish communication with a satellite network of which the satellite is a constituent part.

As used herein, the term "feed" is not intended to imply a particular direction of wave propagation. The feed is usable for transmission and reception since the wave equation displays reciprocity. Accordingly, the term "feed" can imply energy being fed to the parabolic mesh or energy being fed to receiving circuitry to which the feed is connected by a waveguide.

These and other features of the invention will be apparent from the following detailed description and the accompanying figures, in which:

DETAILED DESCRIPTION

Figure 1:
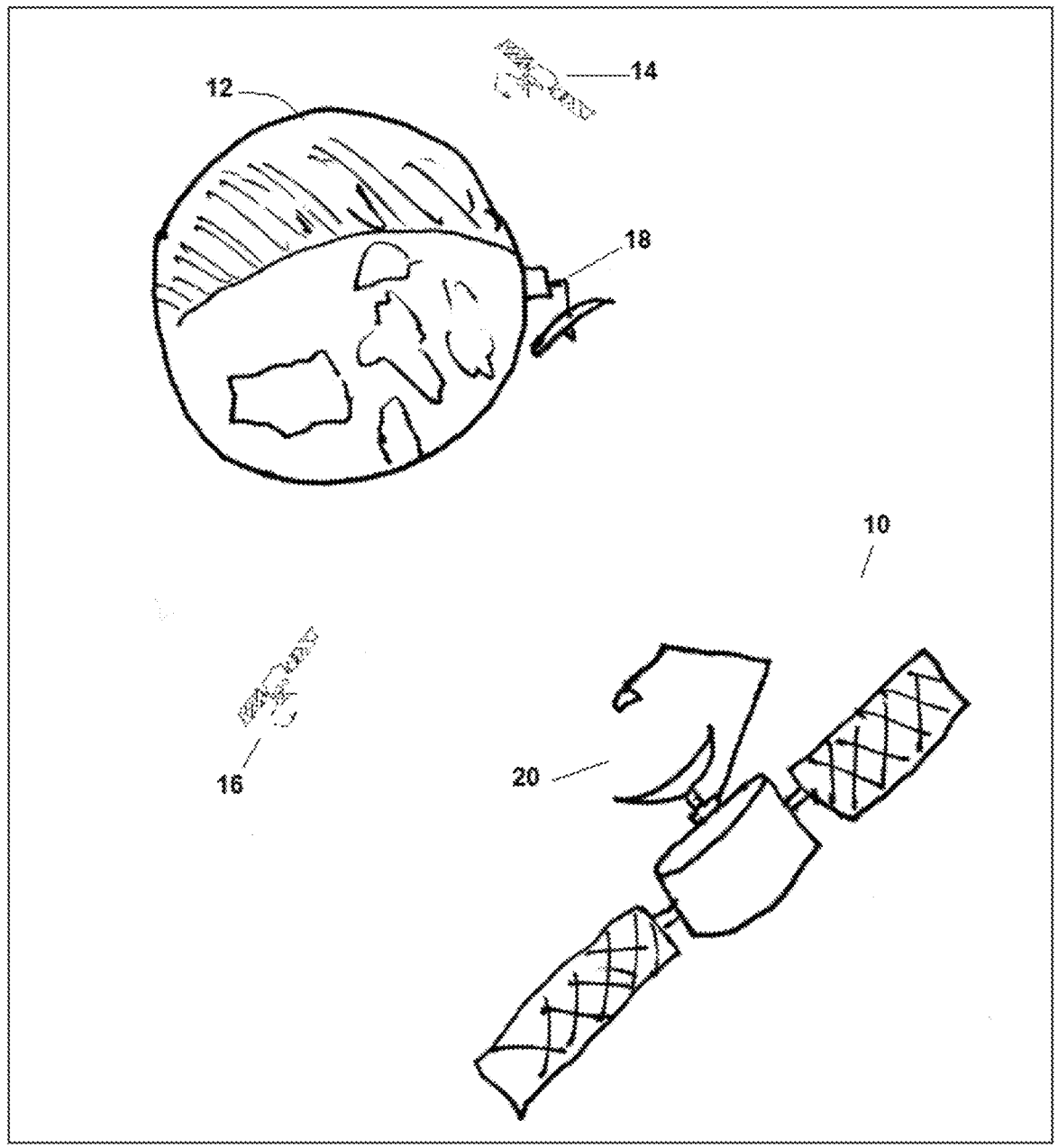
FIG. 1 shows a satellite having an antenna.

FIG. 1 shows a satellite 10 in orbit around the Earth 12. In some embodiments, the satellite 10 is one of a plurality of additional satellites 14, 16 of a satellite network. The satellite 10 receives data from an extrinsic satellite, which is not part of the satellite network. The satellite 10 then relays that data to either another satellite 14, 16 of the satellite network or to a ground station 18. This procedure is also carried out in the opposite direction, to permit the satellite network to relay information to the extrinsic satellite. As a result, it is possible to establish communication between the extrinsic satellite and the ground station 18 without the need for a direct line-of-sight.

The satellite 10 includes an antenna 20 to facilitate such communication. During launch and until the satellite 10 is in orbit, the antenna 20 is stowed within a frame 22, shown in FIG. 2. The frame 22 is preferably small enough to fit conveniently within the satellite 10 during launch. In a typical embodiment, the frame 22 is a rectangular solid having a width and height of approximately 100 millimeters long and a length of approximately 200 millimeters. Once the satellite 10 is in orbit, the antenna 20 is deployed from its stowed position within the frame 22 and reconfigured as shown in FIG. 2.

Figure 2:
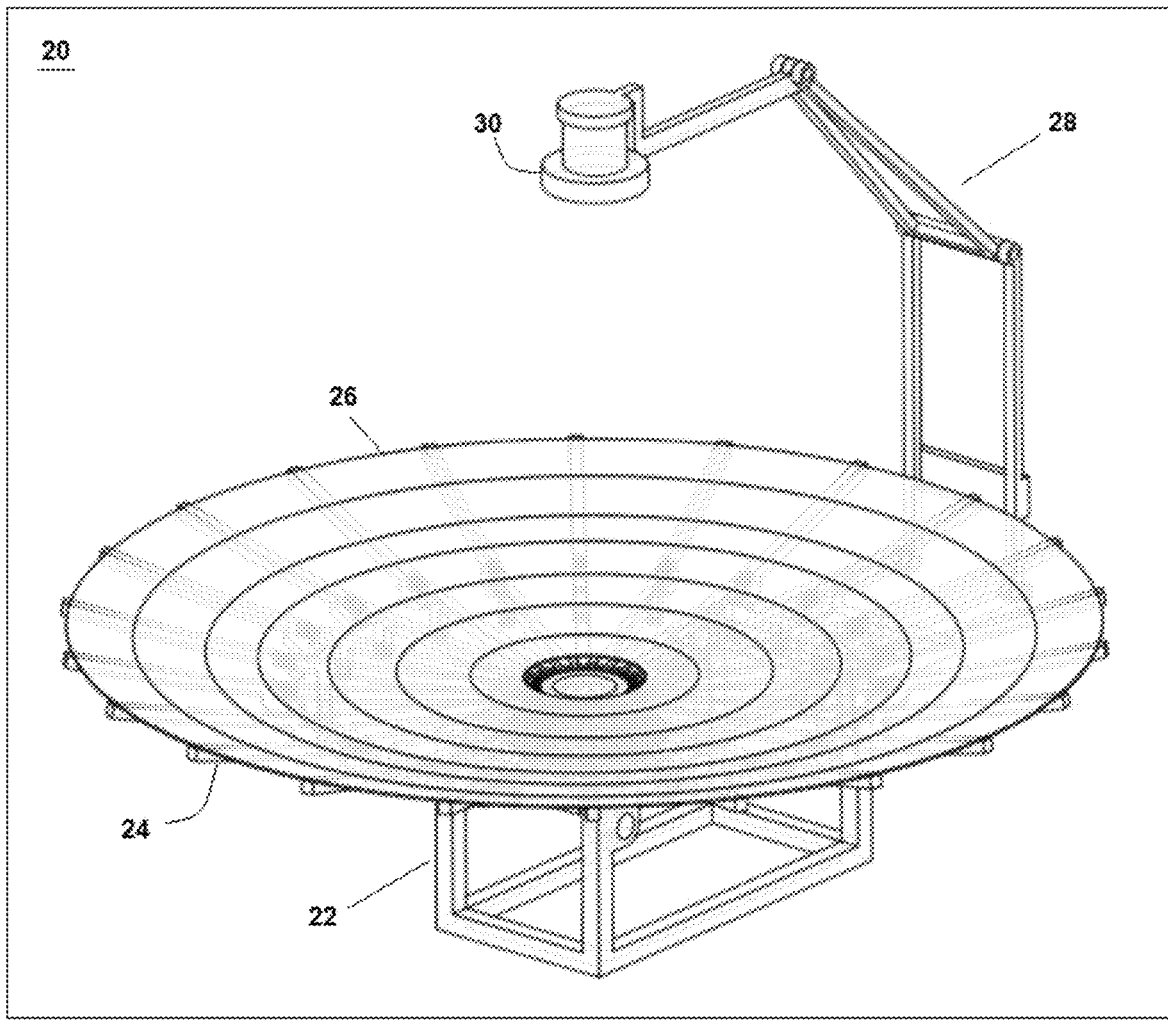
FIG. 2 is an isometric view of the antenna shown in FIG. 1.

As shown in FIG. 2, the frame 22 supports a plurality of hinged ribs 24 that, once unfolded, provide tension and support needed to cause an attached mesh 26 to assume the shape of a paraboloid. A cantilevered arm 28 holds a feed 30 at the focus of the paraboloid.

The wires that form the mesh 26 are made of an RF reflective material, such as gold-plated molybdenum or gold-plated tungsten. The diameter of the mesh 26 as well as the size of the holes formed by the mesh depends on the wavelengths that that the antenna is intended to transmit and receive. For satellite communication, suitable wavelengths are those in S band through Ka band. However, an apparatus as described herein is usable at shorter wavelengths provided that mechanical tolerances can be maintained at an acceptable level.

Figure 3:
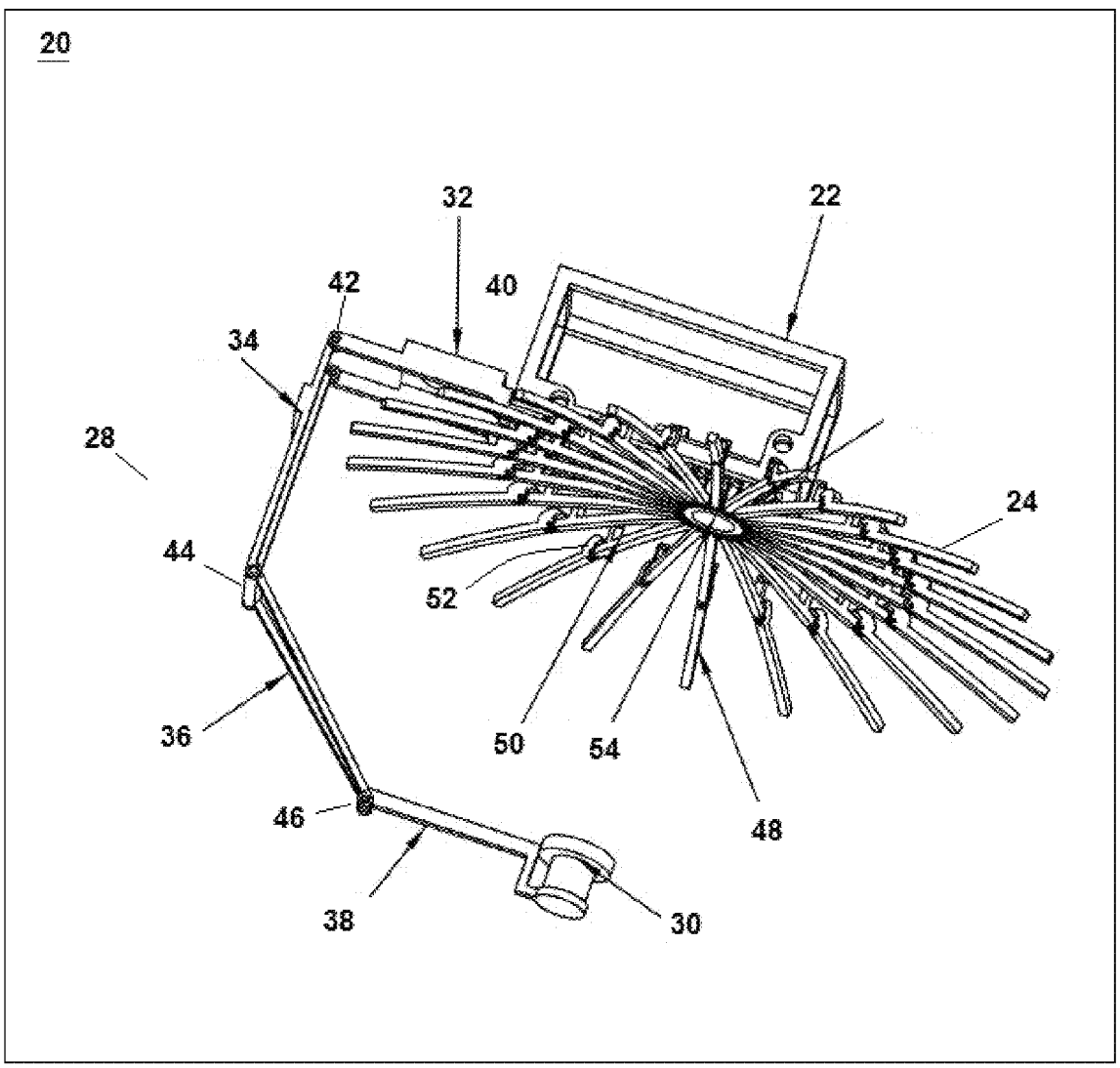
FIG. 3 shows the antenna of FIG. 2 with the mesh removed to expose additional details.

FIG. 3 shows the antenna 20 of FIG. 2 with the mesh 26 having been omitted to reveal the details of the arm 28.

As is apparent from FIG. 3, the arm 28 that holds the feed 30 includes a first segment 32, a second segment 34, a third segment 36, and a fourth segment 38. A first joint 40 couples the first segment 32 and the frame 12 so that the first segment 32 pivots relative to the frame 12. A second joint 42 couples the first segment 32 and the second segment 34 so that the first segment 32 pivots relative to the second segment 34. A third joint 44 couples the second segment 34 and the third segment 36 so that the second segment 34 pivots relative to the third segment 36. A fourth joint 46 couples the third segment 36 and the fourth segment 38 so that the third segment 36 pivots relative to the fourth segment 38. A distal end of the fourth segment 38 supports the feed 30 over the mesh 26.

Each rib 24 includes a tip segment 48 coupled to a root segment 50 by a hinge 52. The root segments 50 of each rib 24 connect to a pusher plate 54 that will be described in more detail in connection with FIGS. 10-12.

Figure 4:
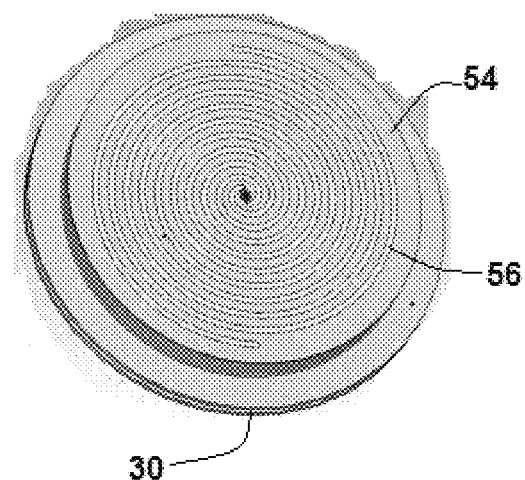
FIG. 4 shows a typical feed for the antenna in FIG. 2.

Referring now to FIG. 4, a feed 30 includes a dielectric substrate 54 on which a pair of conductive paths 56 has been imprinted. In a feed 30 used for sending and receiving waves having a frequency range between 2 GHz and 28 GHz, a useful choice for the paths 56 is one in which the paths 56 a pair of spirals, as shown in FIG. 4. In some embodiments, the paths 56 have a constant width. In others, the paths 56 become wider as a function of distance along the path. A feed 30 having spiral paths as shown in FIG. 4 has been found to radiate in a manner that is largely independent of wavelength over a significantly large range of wavelengths.

Figure 5:
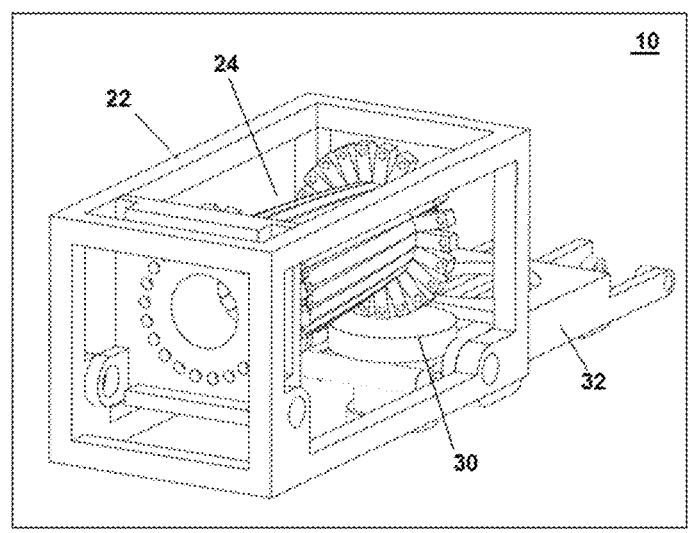
FIG. 5 shows the antenna in a stowed configuration.

FIG. 5 shows the antenna 20 of FIG. 2 folded within the frame prior to deployment. A portion of the arm 28 protrudes from a distal end of the frame 22. The first, second, third, and fourth segments 32, 34, 36, 48 are folded and nestled within each other, and hence not easily seen. However, the feed 30 can be seen emerging from the distal end of the frame 22. In some embodiments, the diameter of the antenna when deployed is approximately half a meter.

Figure 6:
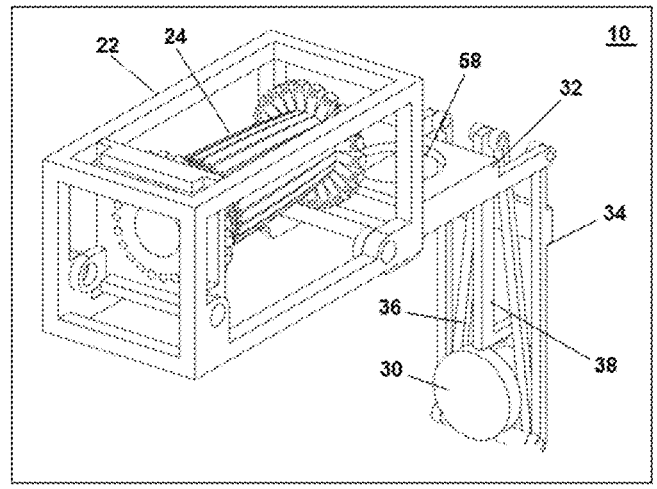
FIG. 6 shows the arm's emergence from the stowed configuration.

In FIG. 6, the feed 30 has fully emerged to reveal a cradle 58 in the first arm segment 32 in which it was being held while in the stowed position.

Figure 7:
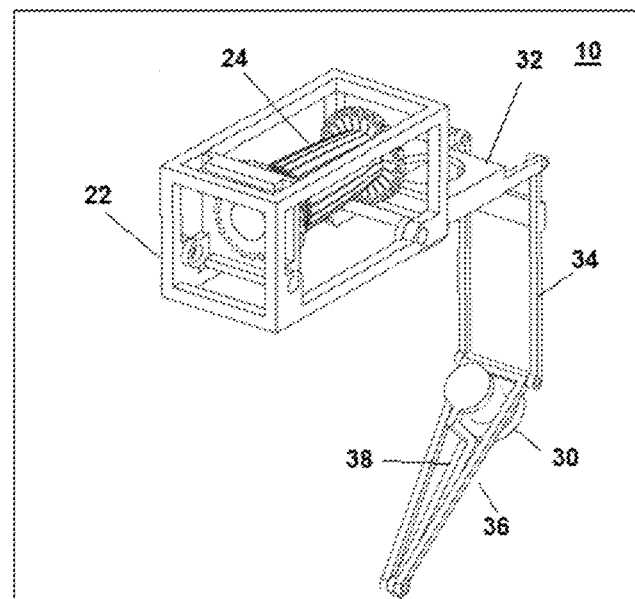
FIG. 7 shows the arm beginning to unfold.

The unfolding of the arm 28 continues in FIG. 7 with the second segment 34 now fully exposed. It is apparent that the second segment 34 is slightly narrower than the first segment 32 so that it can fit within the first segment 32 while stowed in the frame 22. It is also apparent that the third segment 36 has a triangular shape to fit within the second segment 34 and that the fourth segment 38 is merely a single member with the feed 30 at its distal tip. This permits fourth segment 38 to fit within the third segment 36.

Figure 8:
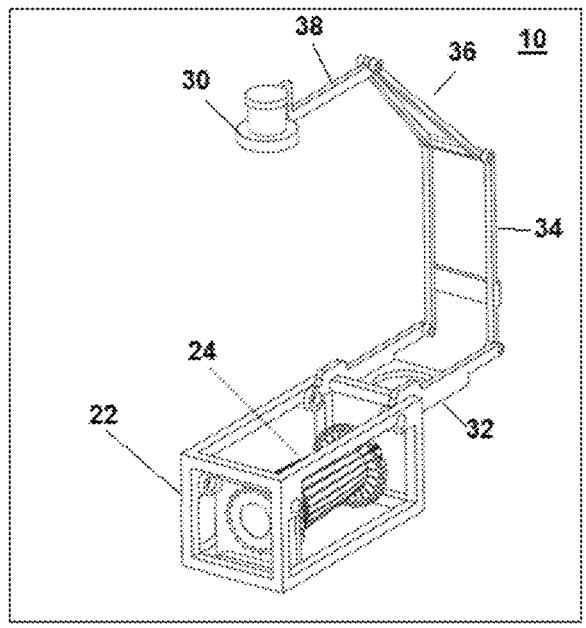
FIG. 8 shows the arm fully deployed.

In FIG. 8, the arm 28 has been fully deployed. In this state, the arm 28 holds the feed 30 at the focus of the paraboloid that is soon to be formed from the mesh 26. By holding the feed 30 with an arm 28 rather than by supporting it on a central mast, it is possible to avoid creating a blind spot in the center of the mesh 26, thereby increasing the antenna's effective aperture.

Figure 9:
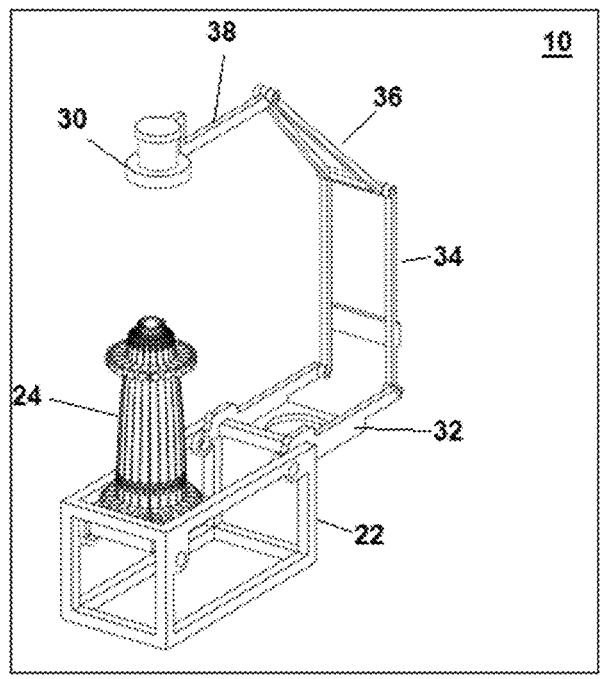
FIG. 9 shows the ribs emerging from the stowed configuration.

FIG. 9 shows the next step, which is to pivot the ribs 24 out of the frame 22 so that a deployment mechanism 60, which is discussed in connection with FIG. 10, can begin the task of unfurling them. Once unfurled, the ribs 24 will hold the mesh 26 in a paraboloid, as shown in FIG. 2.

Figure 10:
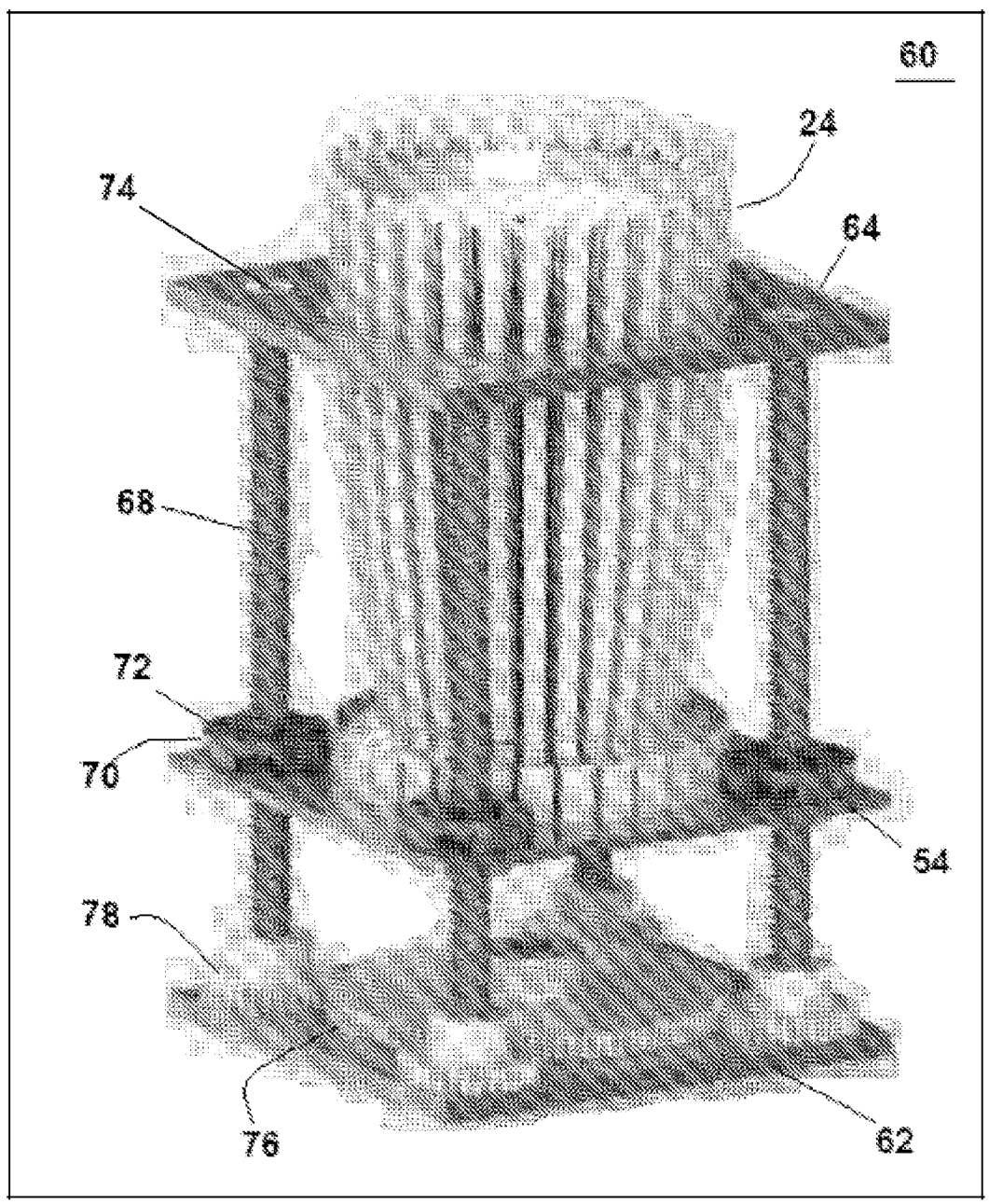
FIG. 10 shows a deployment mechanism for unfurling the ribs shown in FIG. 9.

FIG. 10 shows a deployment mechanism 60 having a bottom plate 62 and a top plate 64. The pusher plate 54 supports the ribs 24. Each of the pusher plate's four corners has a guide aperture to receive a corresponding lead screw 68. The lead screws 68 cooperate with corresponding lead-screw nuts 70 to raise the pusher plate 54 towards the top plate 64. Screws 72 rigidly attach the lead-screw nuts 70 to the pusher plate 54 via screws. Each lead screw 68 is press fit into a corresponding bearing 74 at the top plate 64.

A motor turns a sun gear 76 at the bottom plate 62. The sun gear 80 drives four planetary gears 78, each of which has been press fit to a corresponding one of the lead screws 68. This causes all lead screws 68 to engage at the same time and to spin at the same rate.

This promotes movement of the pusher plate 54 without any tilting that may result from one corner not being driven the same way as another corner. As the pusher plate 54 rises towards the top plate 64, the ribs 24 become progressively freer to unfold and form a support surface for the mesh 26.

Figure 11:
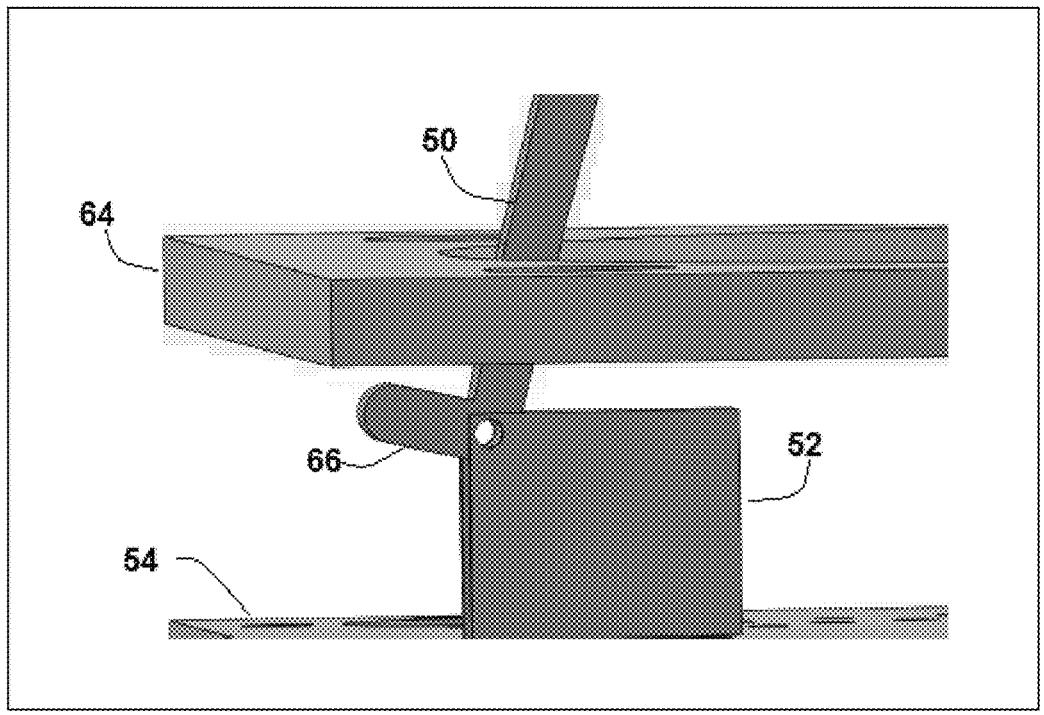
FIG. 11 shows details of the root segment of a rib shown in FIG. 2.

The transition of a rib 24 from its stowed configuration, which is shown in FIG. 9, to its deployed configuration, which is shown in FIG. 2, occurs as a result of an interaction between the root segment 50 and the top plate 64, as shown in FIG. 11.

Referring now to FIG. 11, a lever arm 66 extends perpendicularly from a proximal end of the root segment 50.

Figure 12:
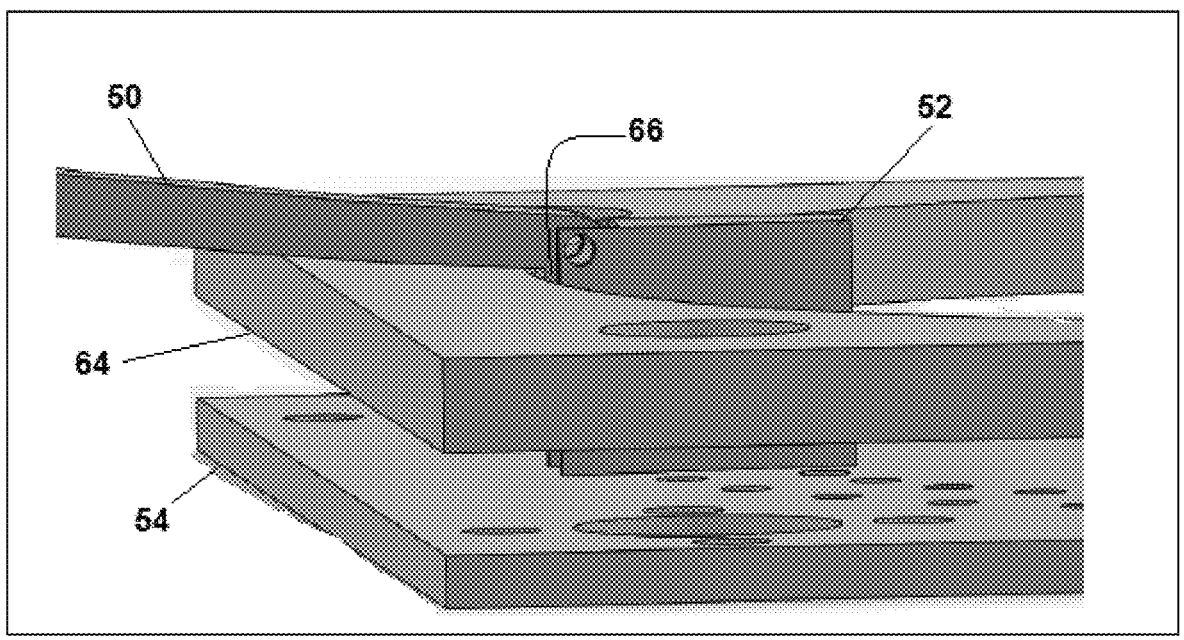
FIG. 12 shows interaction of the root segment with a pusher plate during deployment of the ribs shown in FIG. 2.

The lever arm 66 and the root segment 50 meet at a root hinge within a hinge block 52. As the pusher plate 54 rises, the lever arm 66 and the top plate 64 come into contact. Continued raising of the pusher plate 54 exerts a torque that causes the lever arm 66 to rotate towards the hinge block 52, as shown in FIG. 12. This, in turn, pivots the root segment 50 radially outward.

Figure 13:
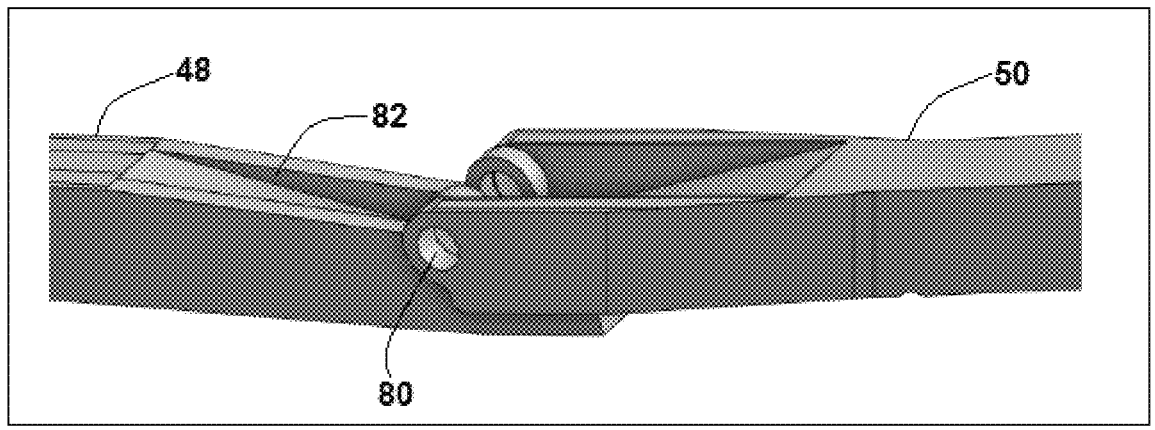
FIG. 13 shows details of a hinge between root and tip segments of a rib shown in FIG. 2.

FIG. 13 shows a middle hinge 80 that connects the root segment 50 and the tip segment 48. In a preferred embodiment, the middle hinge 80 accommodates an expansion pin. Indents 82 centered at the middle hinge 80 permit insertion of torsional screws between ribs 24.

Figure 14:
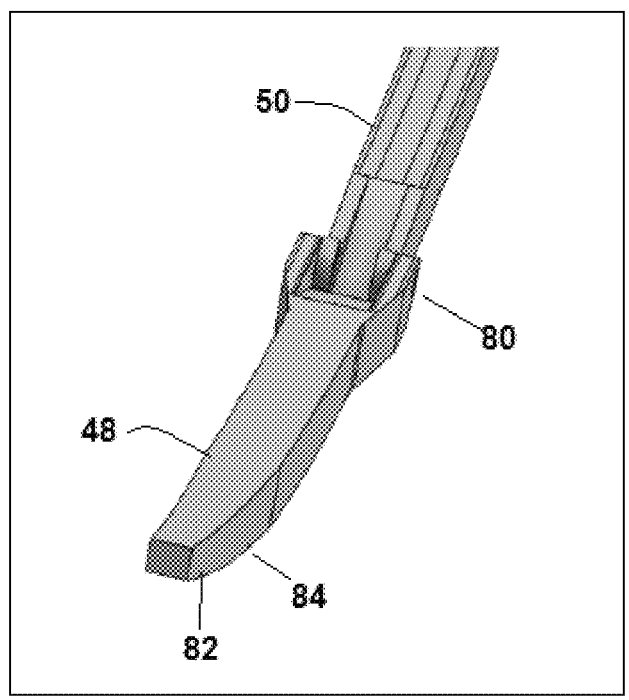
FIG. 14 shows the underside of the tip segment shown in FIG. 13.

FIG. 14 shows indents 82, 84 along the underside of the tip segment 48 for engaging the mesh 26.

Having described the invention, and a preferred embodiment thereof, what is claimed as new and secured by Letters Patent is:

1. An apparatus comprising a frame and an antenna, said antenna comprising ribs that have been folded to fit within said frame, a conductive mesh coupled to said ribs, an arm that has been folded to fit within said frame, and a feed disposed at a distal end of said arm, wherein said feed comprises a dielectric in contact with first and second conductive paths, wherein said arm comprises a proximal segment having a cradle formed therein for receiving said feed.

2. The apparatus of claim 1, wherein said first and second conductive paths define first and second spirals.

3. The apparatus of claim 1, wherein said conductive paths have constant width.

4. The apparatus of claim 1, wherein said arm comprises a distal segment and a proximal segment, said distal end being an end of said distal segment, and wherein said arm further comprises a joint between said distal and proximal segments.

5. The apparatus of claim 1, wherein said arm comprises at least three segments and at least three joints, said joints being disposed to permit articulation of segments relative to each other.

6. The apparatus of claim 1, wherein, when deployed, said arm holds said feed at a focus of a paraboloid formed by said mesh.

7. The apparatus of claim 1, wherein said arm, when deployed, is a cantilevered arm.

8. The apparatus of claim 1, wherein said arm comprises a first segment and a second segment, wherein said second segment is closer to said distal tip than said first segment once said arm has been unfolded, and wherein said second segment is narrower than said first segment.

9. The apparatus of claim 1, wherein each rib comprises a tip segment, a root segment, and a hinge between said root segment and said tip segment, wherein said the tip segment includes a distal tip of said rib, and wherein said root segment is attached to a pusher plate to which all of said ribs are mounted.

10. The apparatus of claim 9, wherein said hinge couples said root segment to said tip segment.

11. The apparatus of claim 1, further comprising a pusher plate, wherein each of said ribs comprises a root segment that is connected to said pusher plate by a corresponding hinge.

12. The apparatus of claim 1, further comprising a satellite, wherein said antenna and frame are constituent parts of said satellite.

13. The apparatus of claim 1, further comprising a satellite network, wherein said antenna and frame are constituent parts of a satellite of said satellite network.

14. The apparatus of claim 1, wherein said mesh comprises gold-coated tungsten.

15. The apparatus of claim 1, wherein said mesh comprises gold-coated molybdenum.

16. A method comprising deploying an antenna on a satellite, wherein deploying said antenna comprises causing a multi-segment arm to emerge from a frame, unfolding said multi-segment arm, causing a feed at a distal tip of said arm to be held away from said frame, wherein said arm comprises a proximal segment having a cradle formed therein for receiving said feed, causing a plurality of ribs to emerge from said frame, causing a mesh connected to said ribs to form a paraboloidal surface having a focus that coincides with a location of said feed.

17. The method of claim 16, further comprising using said antenna to establish communication with a satellite network of which said satellite is a constituent part.

* * * * *